F. S. SUMPTER.
MACHINE FOR MAKING CONCRETE BLOCKS, SLABS, AND THE LIKE.
APPLICATION FILED SEPT. 7, 1921.
1,411,757.
Patented Apr. 4, 1922.
6 SHEETS—SHEET 3.
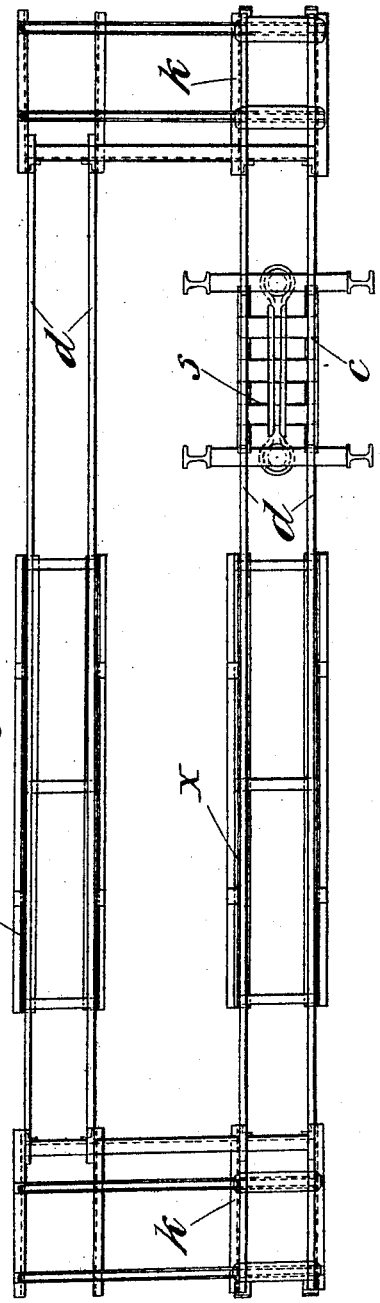
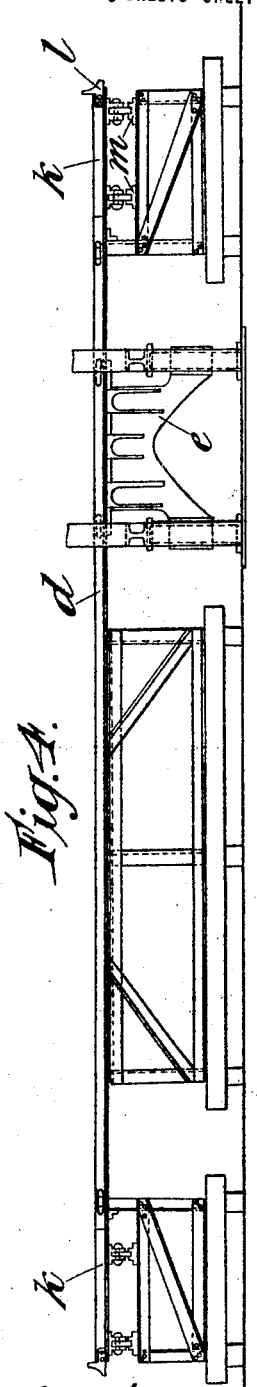

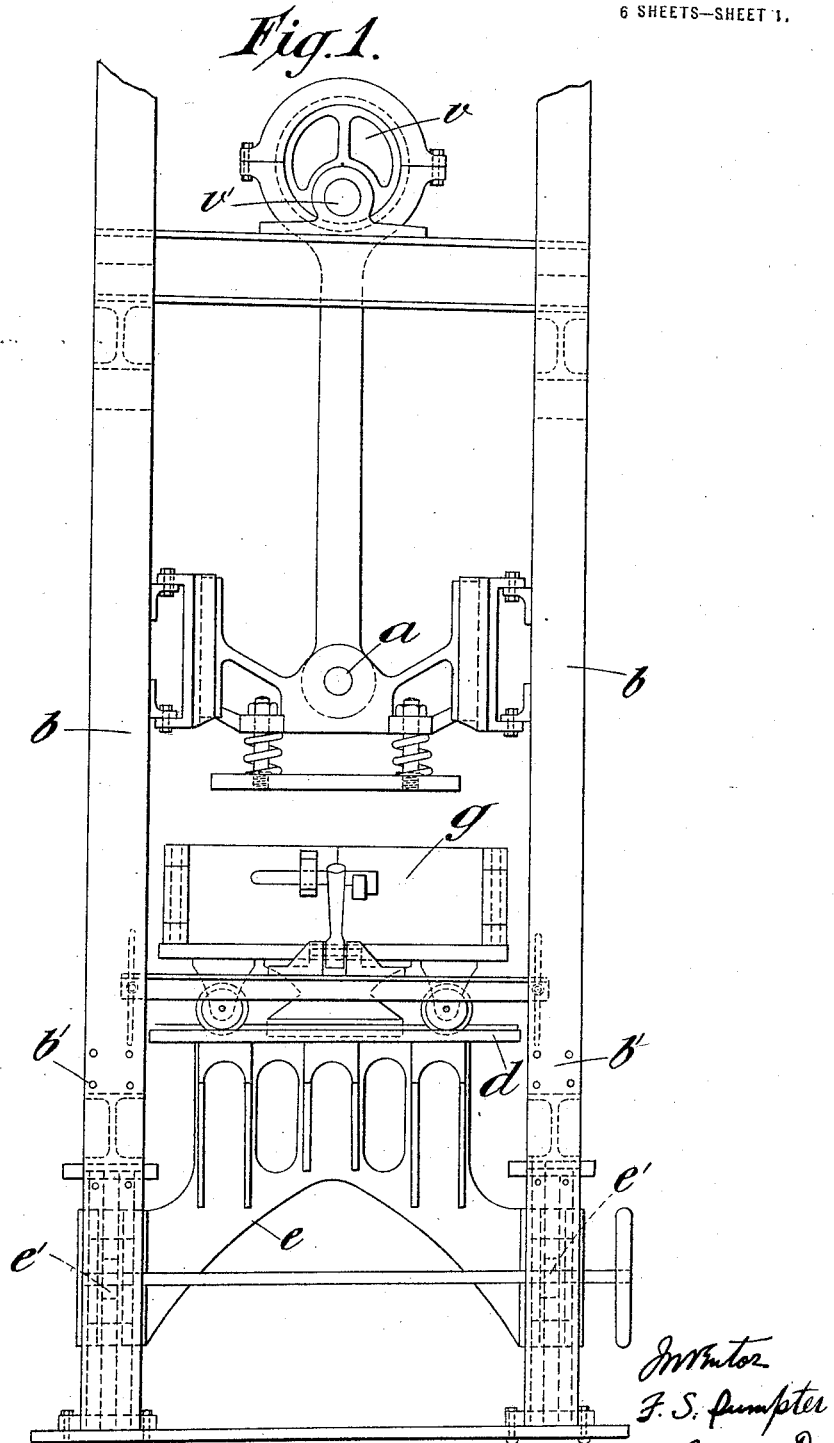

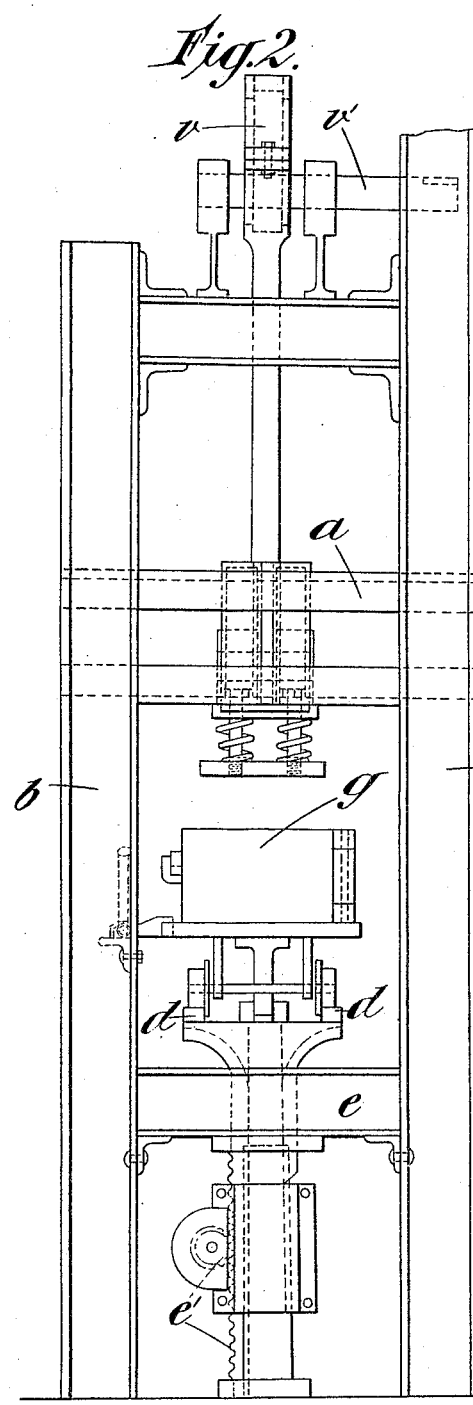

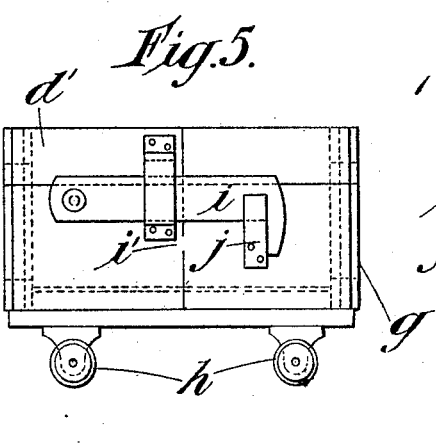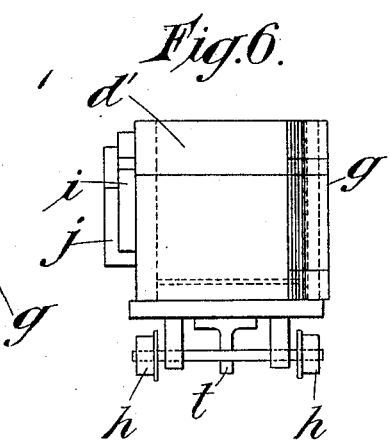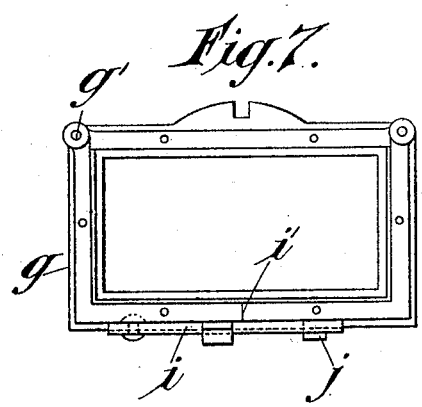

F. S. SUMPTER.
MACHINE FOR MAKING CONCRETE BLOCKS, SLABS, AND THE LIKE.
APPLICATION FILED SEPT. 7, 1921.
1,411,757.
Patented Apr. 4, 1922.
6 SHEETS—SHEET 5.
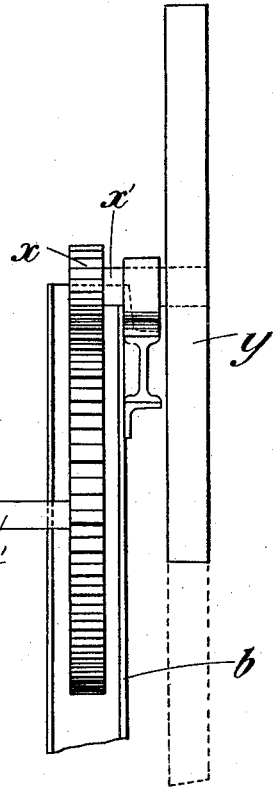
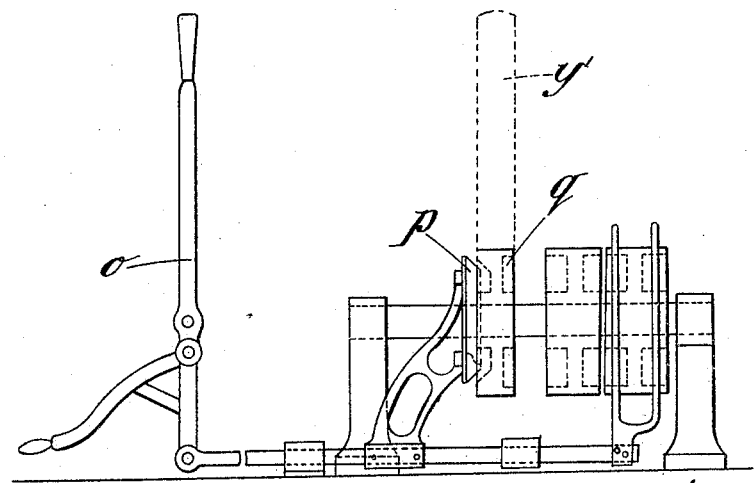

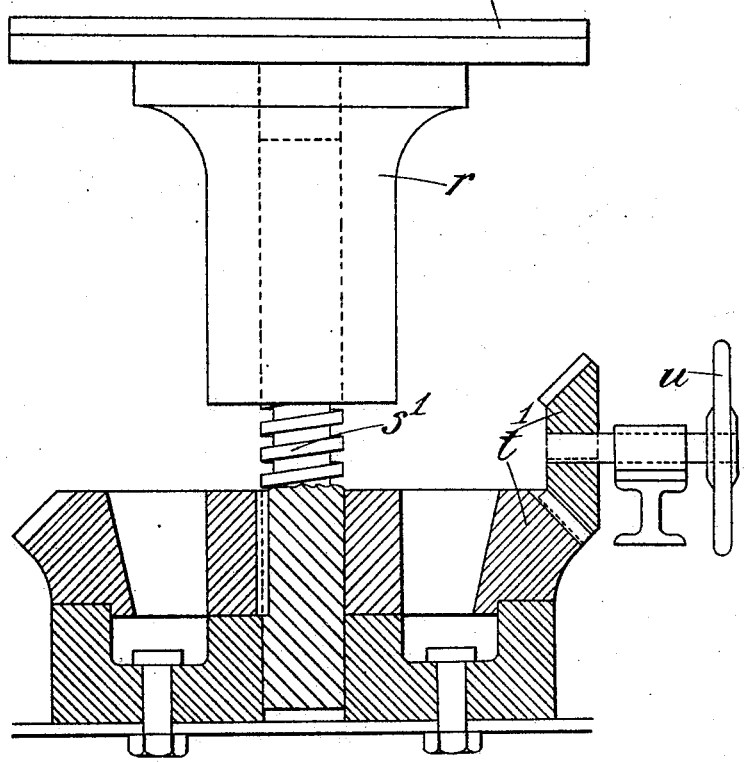

UNITED STATES PATENT OFFICE.

FRED SAMUEL SUMPTER, OF STRATFORD, ENGLAND, ASSIGNOR OF ONE-HALF TO ROBERT FREDERICK FRANK HAMLETT, OF WANSTEAD, ESSEX, ENGLAND.

MACHINE FOR MAKING CONCRETE BLOCKS, SLABS, AND THE LIKE.

1,411,757.   Specification of Letters Patent.   Patented Apr. 4, 1922.

Application filed September 7, 1921.  Serial No. 499,047.

*To all whom it may concern:*

Be it known that I, FRED SAMUEL SUMPTER, a subject of the King of Great Britain and Ireland, and a resident of Stratford, county of Essex, England, have invented a certain new and useful Improvement in Machines for Making Concrete Blocks, Slabs, and the like, (for which I have filed application in Great Britain, No. 17,890, dated 30th June, 1920,) of which the following is a specification.

This invention relates to concrete block-making machines, of the kind in which the mould is mounted on wheels and run into a press, then brought to a standstill and pressed, and then run out on to a track, and the block removed, and has for its object to provide an improved machine for the manufacture of concrete blocks, slabs, and the like, of any required size and shape in a much more expeditious manner than has hitherto been possible.

The improvements constituting the present invention have especial relation to the construction of the mould box, the means for transferring same from the rails on one side of a rectangular track to those on the other, and to the combination therewith of a fixed press driven from an overhead mechanism controlled by a cone-shaped brake operable by hand or foot; all as hereinafter described.

And in order that this invention may be fully understood, it will now be described with reference to the accompanying drawings, in which:—

Figure 1 is a front elevation of the concrete block-making machine in accordance with this invention, showing the mould, in the form of a truck on rails, in position beneath the press fixed above the rails.

Figure 2 is an end elevation of same.

Figure 3 is a plan of the track of rectangular form showing the positions of the press, and the stations for filling and withdrawing the concrete in, and from, the moulds as the latter are moved around the track. In this view is also seen the means by which the moulds are transferred from the rails on one side of the track to those on the other.

Figure 4 shows one side of the track in elevation.

Figures 5, 6 and 7 are, respectively, side elevation, end elevation, and plan of one of the moulds.

Figure 8, in elevation, shows a stopping and starting and brake gear used with the machine.

Figure 9, in part sectional elevation, shows an alternative arrangement of adjustable support for the mould, when beneath the press.

Similar letters of reference are used to indicate like parts wherever occurring.

In carrying this invention into effect, a press comprising a ram $a$, slidably mounted in vertical standards $b$, is erected at a given spot $c$ over the rails $d$, which latter are, at such part, strongly supported by a girder or frame $e$, to enable same to withstand the pressure when applied by the ram $a$. Said frame $e$ is adapted to be raised or lowered by means of a rack and pinion $e'$ operated by a hand wheel so as to be adjustable as to height, and bolts passed through bolt holes $b'$—Figure 1—arranged in vertical alignment in the standards $b$ and into the frame serve to hold the frame securely in the required position.

Alternative means for adjustably supporting the mould under the press are shown in Figure 9, in which a table $r$ carrying a section of the track $d$ is raised or lowered upon a vertical screw-threaded rod $s'$ rotated by means of bevel gearing $t'$ operated by hand wheel $u$.

The ram $a$ is vertically reciprocated by eccentric connection $v$—Figures 1 and 2—with a top driving gear, shown separately in Figure 8, comprising a toothed wheel $w$ mounted on the shaft $v'$ of the eccentric and revolved by a pinion $x$ mounted on the spindle $x'$ supported in a bracket bearing fixed to the standard $b$, and carrying a driving wheel $y$ which is operated by a belt drive $y'$.

The mould $g$ is in box form and is mounted on wheels $h$ to adapt same to travel on the rails $d$ of the track. Said mould $g$ is made capable of accommodating the concrete for blocks of varying thickness by adding to the height of the walls. For this purpose extension pieces $d'$ (see Figures 5 and 6) are made use of, being bolted or fixed in any suitable manner at the sides and ends of the mould when it is desired to form a block or slab of extreme thickness.

The ends and the front wall of the mould are made in two parts, as at $g'$—Figure 7—hinged at the rear of the mould and meeting at the front at $l'$ where they are locked by means of latch $i$ and staple or catch $j$. To remove the pressed block from the mould, the hinged walls are opened out and the block withdrawn on its pallet.

The track upon which the moulds travel, which is shown in Figures 3 and 4 as of a rectangular form, comprises two pairs of rails in parallel relation to one another and connected at each end of the track by a sliding rail or table $k$. Said track is provided with suitable stations or stopping places for the loading and unloading of the moulds, marked X and Y respectively in Figure 3, as they traverse the track as well as with the strongly supported station $c$ at which the pressure is applied to the concrete in the mould, and with guides $s$—Figure 3—into which rest guide tongues $t$—see Figure 6—on the underside of the track slide.

After the block has been pressed at the station $c$ the mould is run to the end of the line on that side of the track, a suitable stop $l$ being provided to arrest its travel. Said mould is then transported to the return rail $d$ on the other side of the track by means of the sliding table $k$ which runs on rails $m$—see Figure 4—arranged transversely of, and at a lower level than, the rails $d$, all so that when the mould is at the end of the track, said sliding table $k$ is passed across the track and under the mould and is then withdrawn, carrying with it the mould and bringing it in alignment with the rails upon the other side of the track. The mould is then passed on to the rails on that side of the track and may be unloaded at the station marked Y. When unloaded, the mould is passed on to the station marked X, when it is again loaded and passed on to the pressing station $c$, and, when pressed, on to the end of the rails, and, supported on the sliding table $k$ at that end, is returned to the rails leading to the unloading station.

Thus a number of moulds may be placed in the press, the block pressed, and passed onwards, consecutively and in rapid succession.

A driving gear suitable for operating the above-described press is shown in Figure 8, and which is controlled by the hand or foot-operated lever $o$ which serves to throw the belt-shifting fork on to either fast or loose pulley as desired, and at the same time to place in or out of engagement a cone-shaped brake block $p$ provided, which engages in a corresponding groove in the surface of the wheel $q$.

I claim:—

An apparatus for forming articles from plastic material including a trackway and a wheeled mold shiftable thereon, said wheeled mold comprising a platform and adjustable sides including a relatively fixed side wall, and also angular side and end wall forming members hinged to said relatively fixed side wall, and means for locking said angular wall forming members at the joint.

In testimony whereof I have hereunto affixed my signature this 25th day of August 1921.

FRED SAMUEL SUMPTER.